(12) United States Patent
Atzler et al.

(10) Patent No.: US 10,690,898 B2
(45) Date of Patent: Jun. 23, 2020

(54) LIGHT-FIELD MICROSCOPE WITH SELECTIVE-PLANE ILLUMINATION

(71) Applicant: Molecular Devices (Austria) GmbH, Wals (AT)

(72) Inventors: Josef Atzler, Hallein (AT); Andreas Kenda, Klagenfurt (AT)

(73) Assignee: Molecular Devices (Austria) GMBH, Wals (AT)

( * ) Notice: Subject to any disclaimer, the term of this patent is extended or adjusted under 35 U.S.C. 154(b) by 0 days.

(21) Appl. No.: 15/266,310

(22) Filed: Sep. 15, 2016

(65) Prior Publication Data

US 2018/0074305 A1 Mar. 15, 2018

(51) Int. Cl.
| | | |
|---|---|---|
| *G02B 21/08* | (2006.01) | |
| *G02B 21/00* | (2006.01) | |
| *G02B 21/36* | (2006.01) | |
| *G02B 27/00* | (2006.01) | |
| *G01N 21/64* | (2006.01) | |

(Continued)

(52) U.S. Cl.
CPC ....... *G02B 21/082* (2013.01); *G01N 21/6458* (2013.01); *G02B 21/008* (2013.01); *G02B 21/0032* (2013.01); *G02B 21/16* (2013.01); *G02B 21/26* (2013.01); *G02B 21/361* (2013.01); *G02B 21/365* (2013.01); *G02B 21/367* (2013.01); *G02B 27/0075* (2013.01); *G01N 2201/062* (2013.01); *G01N 2201/0612* (2013.01); *G01N 2201/0636* (2013.01); *G01N 2201/0638* (2013.01)

(58) Field of Classification Search
CPC ...... G02B 21/082; G02B 21/16; G02B 21/26; G02B 21/361; G02B 21/365; G01N 21/6458
See application file for complete search history.

(56) References Cited

U.S. PATENT DOCUMENTS

| | | |
|---|---|---|
| 7,936,392 B2 | 5/2011 | Ng et al. |
| 8,315,476 B1 | 11/2012 | Georgiev et al. |
| 8,395,696 B2 | 3/2013 | Ng et al. |

(Continued)

FOREIGN PATENT DOCUMENTS

| | | |
|---|---|---|
| DE | 102005027077 A1 | 5/2006 |
| DE | 102014102215 A1 | 8/2015 |
| WO | 2016071033 A1 | 5/2016 |

OTHER PUBLICATIONS

Santi, Peter A., "Light Sheet Fluorescence Microscopy: A Review", Journal of Histochemistry & Cytochemistry 59 (2) 129-138, The Author(s) 2011.

(Continued)

*Primary Examiner* — Marcus H Taningco
(74) *Attorney, Agent, or Firm* — Ronald A. Rudder; Olive Law Group PLLC

(57) ABSTRACT

A light-field microscope includes a light-sheet focusing device configured for outputting illumination light as a light sheet, and a microlens array between an objective lens and a light detector. A sample is irradiated by the light sheet along a direction non-parallel to the sample plane. Light-field data may be acquired from the sample without needing to scan through the thickness of the sample. The microscope implements light-field acquisition in conjunction with selective plane illumination.

27 Claims, 10 Drawing Sheets

(51) Int. Cl.
*G02B 21/16* (2006.01)
*G02B 21/26* (2006.01)

(56) References Cited

U.S. PATENT DOCUMENTS

| | | | |
|---|---|---|---|
| 8,547,475 B2 | 10/2013 | Ng et al. | |
| 8,619,177 B2 | 12/2013 | Perwass et al. | |
| 8,698,944 B2 | 4/2014 | Ng et al. | |
| 8,717,489 B2 | 5/2014 | Ng et al. | |
| 9,134,521 B2 | 9/2015 | Huisken | |
| 9,201,011 B2* | 12/2015 | Kalkbrenner | G01N 21/6428 |
| 9,239,454 B2 | 1/2016 | Lippert et al. | |
| 2013/0286181 A1* | 10/2013 | Betzig | H04N 7/18 348/79 |
| 2014/0126046 A1 | 5/2014 | Shroff et al. | |
| 2015/0098126 A1* | 4/2015 | Keller | G02B 21/0076 359/385 |
| 2015/0185460 A1* | 7/2015 | Nakasho | G02B 21/16 250/459.1 |
| 2016/0041099 A1* | 2/2016 | Parthasarathy | G01N 21/6458 250/459.1 |
| 2016/0153892 A1* | 6/2016 | Knebel | G02B 21/0032 359/385 |
| 2016/0363752 A1* | 12/2016 | Mizunaka | G02B 21/08 |
| 2017/0068080 A1* | 3/2017 | Anhut | G02B 27/0075 |
| 2017/0068083 A1* | 3/2017 | Hayashi | G02B 21/08 |
| 2019/0212536 A1* | 7/2019 | Fahrbach | G01N 21/6458 |

OTHER PUBLICATIONS

Broxton, Michael et al., "Wave Optics Theory and 3-D Deconvolution for the Light Field Microscope", 2013 Optical Society of America, Oct. 21, 2013, vol. 21, No. 21.

Levoy, Marc et al., "Light Field Microscopy", ACM Transactions on Graphics 25(3), Porc SIGGRAPH 2006.

Huisken, Jan et al., "Selective Plane Illumination Microscopy Techniques in Developmental Biology", Department of Biochemistry and Biophysics, and Cardiovascular Research Institute, University of California, San Francisco, CA 94158, Development 136, pp. 1963-1975 (2009) doi: 10.1242/dev.022426.

Cohen, Noy et al., "Enhancing the Performance of the Light Field Microscope Using Wavefront Coding", 2014 Optical Society of America, Oct. 6, 2014, vol. 22, No. 20.

International Search Report and Written Opinion issued in counterpart PCT Application No. PCT/IB2017/055599 dated Dec. 22, 2017 (twelve (12) pages).

* cited by examiner

LIGHT-FIELD MICROSCOPE WITH SELECTIVE-PLANE ILLUMINATION

TECHNICAL FIELD

The present invention generally relates to microscopy for imaging samples, including three-dimensional microscopy and fluorescence-based microscopy. In particular, the invention relates to microscopy that implements selective-plane illumination in conjunction with acquiring light-field information.

BACKGROUND

Microscopy denotes a class of analytical techniques involving the imaging of samples such as, for example, biological material (e.g., cells, tissue, etc.) and non-biological material (e.g., particulate matter). Known light-based (optical) microscopic techniques include, for example, bright-field microscopy, dark-field microscopy, confocal microscopy, and selective plane illumination microscopy (SPIM). A light-based microscopic technique may be enhanced by inducing fluorescence in the sample being imaged. Moreover, some microscopes are capable of three-dimensional (3D) imaging of a sample, typically by scanning the axial depth of focus through the sample to acquire multiple images (a focal stack) and subsequently processing the images to generate a 3D image. This post-acquisition processing typically entails heavy computation, including the use of 3D deconvolution algorithms, registration algorithms, etc.

3D fluorescence imaging of biological samples is typically performed by confocal microscopy or SPIM. Confocal microscopy can deliver brilliant and highly resolved images, but is highly time consuming and requires complex and thus costly system hardware. SPIM is potentially faster and cheaper, but needs special sample preparation and holders. SPIM is described by Huisken et al., Selective plane illumination microscopy techniques in developmental biology, *Development*, Vol. 136(12), p. 1963-1975 (2009), the content of which is incorporated by reference herein in its entirety. Recently, light-field imaging is being proposed as a 3D microscopic imaging method. Light-field imaging captures information regarding both the intensity of light in a scene and the direction of travel of the light rays, as compared to capturing just light intensity in the case of traditional microscopes. Thus far, however, experimental work has shown that light-field imaging produces an unacceptable amount of image artifacts and background noise. Light-field technology is described in U.S. Pat. No. 7,936,392; U.S. Pat. No. 8,717,489; Levoy et al., Light Field Microscopy, *ACM Transactions on Graphics*, Vol 25(3), p. 1-11, Proc. SIGGRAPH (2006); and Cohen et al., Enhancing the performance of the light field microscope using wavefront coding, *OPTICS EXPRESS*, Vol. 22, No. 20 (2014); and Broxton et al., Wave optics theory and 3-D deconvolution for the light field microscope, *OPTICS EXPRESS*, Vol. 21, No. 21 (2013); the contents of each of which are incorporated by reference herein in their entireties.

There is an ongoing need for microscopes and methods for 3D microscopic imaging. Particularly for studies and analyses of complex and functional biological samples such as organoids and spheroids, a fast microscopic imaging method resolving 3D information is needed.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to an embodiment, a light-field microscope includes: a light source configured for generating illumination light; a condenser lens configured for receiving the illumination light from the light source and outputting the illumination light as focused illumination light; a light-sheet focusing device configured for receiving the focused illumination light from the condenser and outputting the illumination light as a light sheet; a sample stage configured for supporting a sample in a sample plane and for receiving the light sheet along an illumination direction non-parallel to the sample plane; an objective lens configured for receiving detection light from the sample; a microlens array configured for receiving the detection light from the objective lens; and a light detector configured for receiving the detection light from the microlens array and measuring light-field parameters of the detection light.

According to another embodiment, a method for acquiring a light-field image from a sample includes: supporting the sample in a focal plane of an objective lens; generating illumination light; focusing the illumination light as a light sheet; irradiating the sample by directing the light sheet to the sample along an illumination direction non-parallel to the sample plane, wherein in response to the irradiating, the sample emits detection light; directing the detection light through a microlens array to a light detector; and measuring light-field parameters of the detection light at the light detector.

According to another embodiment, a light-field microscope is configured for performing all or part of any of the methods disclosed herein.

Other devices, apparatuses, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
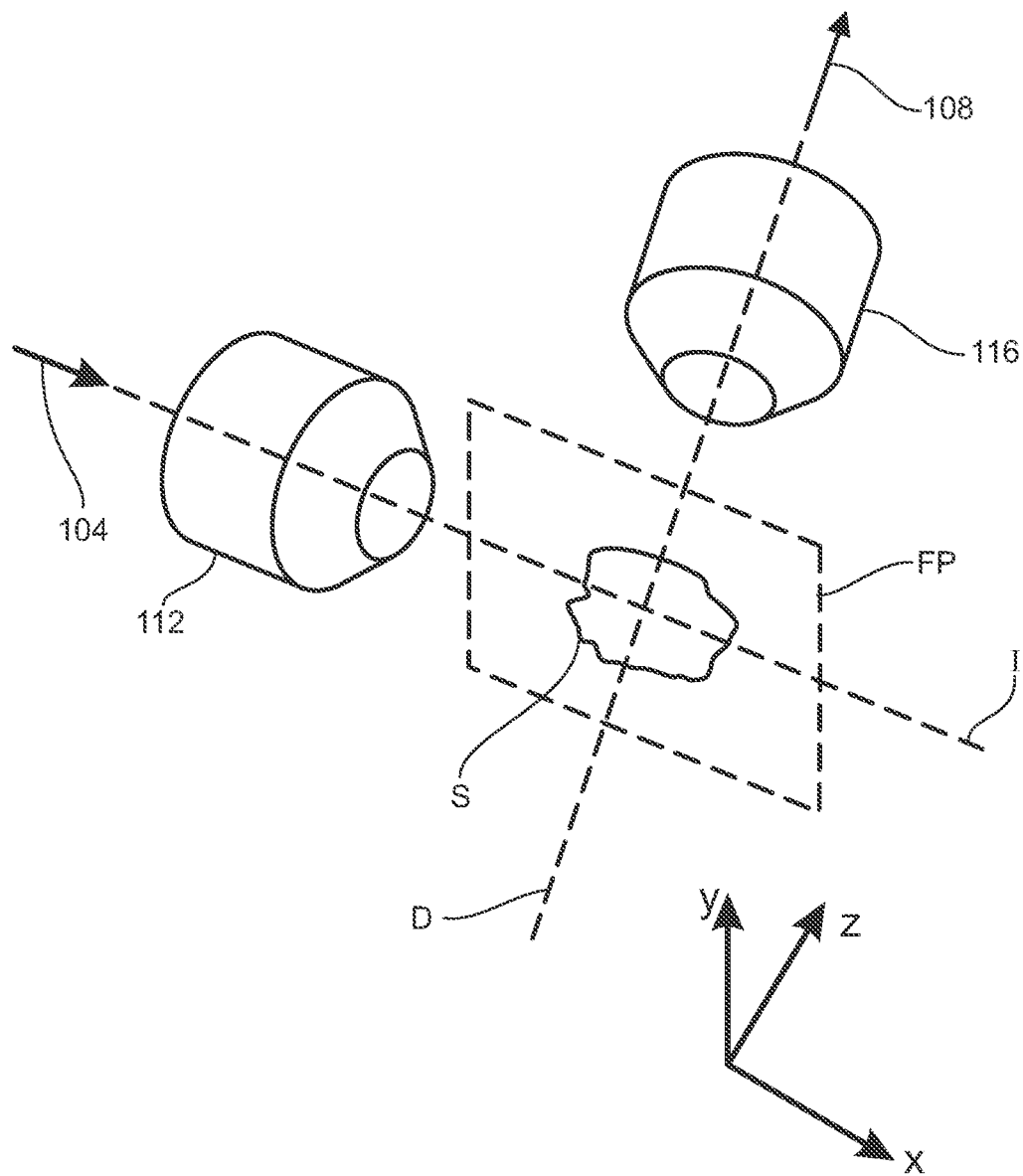
FIG. 1 is a schematic view of a conventional configuration for a microscope employed to perform selective plane illumination microscopy (SPIM) on a sample.

As used herein, the term "sample" generally refers to any object or material for which imaging is desired and which is mountable to a sample stage as described herein. The sample may be biological (e.g., biological cells, tissues, organoids, spheroids, intracellular components, spores, fungi, molds, bacteria, viruses, biologically derived particles such as skin cells, detritus, etc.) or non-biological (e.g., chemical compound, particulate matter, etc.). The sample may be a physiological material, a food sample, an environmental sample, etc. The sample may be partially or wholly a liquid or a solid. The sample may be pretreated prior to use, such as preparing plasma from blood, diluting viscous fluids, sectioning the sample, staining the sample, adding a reagent, adding a fluorophore or other label, etc. Methods of pretreatment may also involve filtration, precipitation, dilution, distillation, concentration, inactivation of interfering components, chromatography, separation steps, etc. as appreciated by persons skilled in the art.

As used herein, the term "light" generally refers to electromagnetic radiation, quantizable as photons. As it pertains to the present disclosure, light may propagate at wavelengths ranging from ultraviolet (UV) to infrared (IR). Thus in the present disclosure, the term "light" is not intended to be limited to electromagnetic radiation in the visible range. In the present disclosure, the terms "light," "photons," and "radiation" are used interchangeably.

As used herein, terms such as "illumination light" and "excitation light" refer to light generated and transmitted for the purpose of illuminating a sample. Depending on the embodiment, the illumination light (or excitation light) may be broadband light or narrowband light (i.e., limited to one wavelength or a range spanning a few wavelengths). In fluorescence-based embodiments, the illumination light (or excitation light) incident on the sample has a wavelength effective for inducing fluorescence. For convenience, the terms "illumination light" and "excitation light" are used interchangeably herein, in the case of either fluorescence-based or non-fluorescence-based embodiments, unless specifically indicated otherwise or the context dictates otherwise.

As used herein, terms such as "detection light" and "emission light" refer to light propagating from a sample and which may be collected to acquire images of the sample. In non-fluorescence-based embodiments, the detection light (or emission light) may be light scattered or reflected from, or transmitted through, the sample. Such non-fluorescent light generally may have the same wavelength(s) as the illumination light incident on the sample. In fluorescence-based embodiments, the detection light (or emission light) includes at least the light emitted from the sample as a consequence of fluorescence, which has a longer wavelength than the illumination light incident on the sample. In fluorescence-based embodiments, the non-fluorescent light is blocked, filtered, or deflected away from the detection light path so that only the fluorescent light is incident on the light detector and utilized to acquire images of the sample. For convenience, the terms "detection light" and "emission light" are used interchangeably herein, unless specifically indicated otherwise or the context dictates otherwise.

As used herein, the term "lens" may refer to either a single lens or a lens group (a series of lenses), depending on the embodiment and the function of the lens(es), as appreciated by persons skilled in the art.

FIG. 1 is a schematic view of a conventional configuration for a microscope employed to perform selective plane illumination microscopy (SPIM) on a sample S. For illustrative purposes, FIG. 1 includes a Cartesian (x, y, z) frame of reference, the origin (x=0, y=0, z=0) of which has been arbitrarily positioned relative to the sample S and other illustrated features. In the present context, the x-axis and y-axis are taken to lie in a transverse plane. The sample S, or at least a slice of the sample S being illuminated, lies in a sample plane that in the present context corresponds to (or is parallel with) the transverse plane. The z-axis is taken to be the axis or direction that is orthogonal to the transverse plane and thus the sample plane. Accordingly, the thickness of the sample S is defined along the z-axis (or z-direction).

Figure 2:
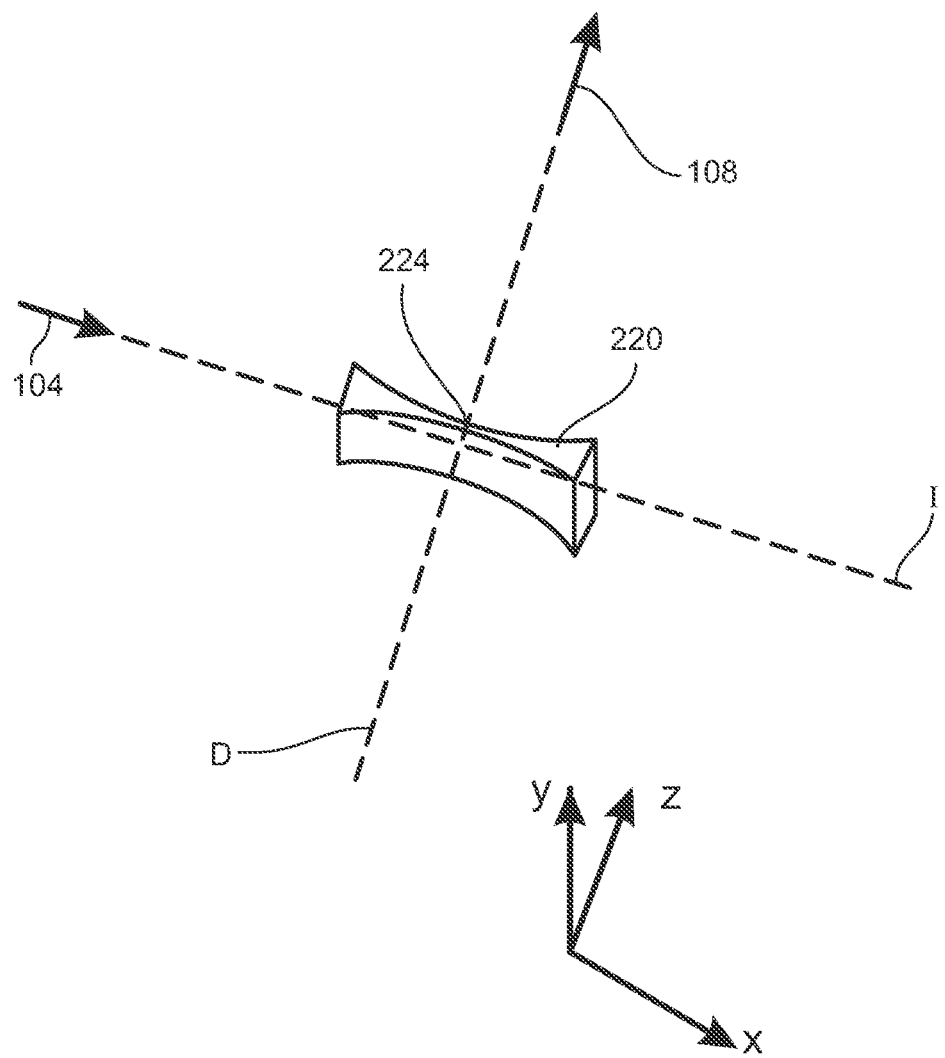
FIG. 2 is a schematic view of a light sheet, or more specifically a portion of the light sheet (its length along the z-axis truncated) in the region where a sample is positioned, in conventional SPIM.

The conventional SPIM microscope includes illumination optics defining an illumination light path for illumination light 104 to propagate generally along an illumination axis I, and detection optics defining a detection light path for detection light 108 to propagate generally along a detection axis D. The illumination optics include an illumination objective lens 112 as well as other optical components, and the detection optics include a detection objective lens 116 as well as other optical components, as appreciated by persons skilled in the art. The detection objective lens 116 has a focal plane FP (in the transverse x-y plane) at which in-focus images can be acquired by the light detector (not shown) that receives the detection light 108. As a type of light sheet microscopy (LSM), the illumination optics are configured to focus the illumination light 104 into a thin, planar light sheet, i.e., a beam with a substantially rectilinear cross-section. FIG. 2 is a schematic view of a light sheet 220, or more specifically a portion of the light sheet 220 (its length along the z-axis truncated) in the region where the sample S is positioned. As a further characteristic of conventional SPIM, the illumination axis I (along the x-axis) along which the light sheet 220 propagates is orthogonal to the detection axis D (along the z-axis) along which the detection light 108 propagates. Further, the sample S is positioned and oriented such that the sample plane lies in the focal plane FP and hence is orthogonal to the detection axis D, and the light sheet 220 propagates along the focal plane FP (and thus the sample plane) as the light sheet 220 passes through the sample S. Hence, SPIM in effect optically sections the sample S, i.e., only a small part of the thickness (in the direction of the z-axis) of the sample S is illuminated by the light sheet 220.

As shown in FIG. 2, as the light sheet 220 travels along the x-axis, the thickness of the light sheet 220 (in the direction of the z-axis) converges to a focal point, or "beam waist" 224, and then diverges back to a larger thickness. The illumination optics position the light sheet 220 so that the beam waist 224 is in the sample chamber (not shown) containing the sample S and at the focal plane FP. Generally, the beam waist 224 is positioned at the center of the field of view (FOV) of the detection objective lens 116 and in a central region of the sample S.

Figure 3:
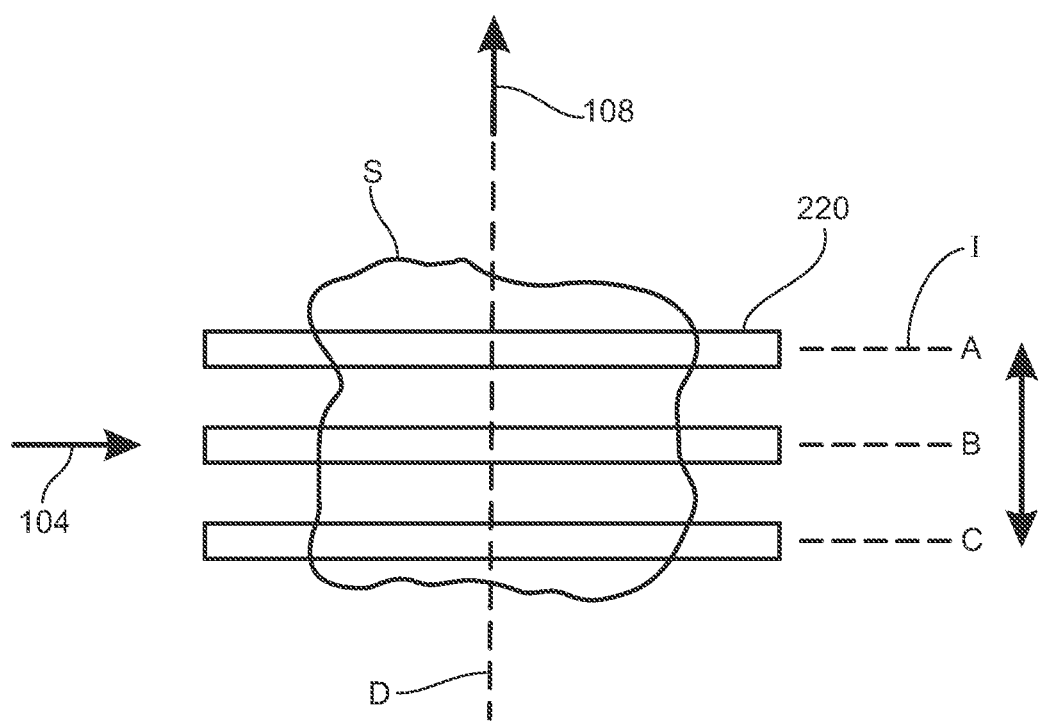
FIG. 3 is a schematic illustration of the process of scanning the thickness of a sample to acquire multiple images for 3D processing in conventional SPIM.
Figure 3:
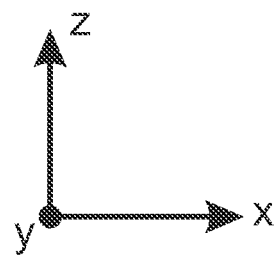

In comparison to other conventional techniques such as wide-field and confocal microscopy, because SPIM exposes the sample S to only the thin light sheet 220 (a thin volume or section of the sample S around the sample plane/focal plane FP), SPIM can image the sample S with less risk of photo-bleaching, photo-damage (e.g., photo-toxicity), and heating. However, SPIM has disadvantages. As in the case of confocal microscopy and other conventional microscopy, 3D imaging requires scanning the sample S (or scanning the focal plane FP) along the detection axis D to acquire multiple (essentially 2D) images incrementally (step-wise) and thereby produce a stack of images (z-stack), followed by post-processing to render a 3D image from the multiple 2D images. FIG. 3 is a schematic illustration of the process of scanning the thickness of the sample S to acquire multiple images for 3D processing in conventional SPIM. The sample S is scanned through multiple positions on the detection axis D, in one or both directions along the detection (z) axis D as indicated by a double-headed arrow in FIG. 3. The sample S is scanned, typically by motorized means, by either moving (translating) the sample S along the detection axis D relative to the illumination axis I or moving the illumination axis I relative to the sample S. FIG. 3 illustrates three translational positions A, B, and C at which the illumination axis I (and focal plane FP, FIG. 1) may be positioned as part of scanning the sample S to build a z-stack for 3D processing. A separate image must be acquired at each position A, B, and C and digitally stored. Then all of the images so acquired must be processed by executing various software-implemented algorithms to construct the 3D image. It will be noted that illustration of only three translational positions A, B, and C is a simplification, and that many more images are acquired (e.g., 100) during the scanning process.

Another disadvantage is that light sheet illumination can cause shadow artifacts or stripes to appear in the image, due to the light sheet 220 entering the sample S from one side and encountering opaque structures as the light sheet 220 passes through the sample S toward the other side. See Santi, Peter A., Light Sheet Fluorescence Microscopy: A Review, *Journal of Histochemistry & Cytochemistry*, Vol. 59(2), p. 129-138 (2011); and U.S. Pat. No. 9,134,521; the contents of which are incorporated by reference herein in their entireties. Also, the sample plane can be unevenly illuminated due to the light sheet 220 entering the sample S from one side only. That is, the portion of the sample plane closest to the side at which the light sheet 220 enters is better illuminated in comparison to the portion of the sample plane farthest from the side at which the light sheet 220 enters, due to light absorption as the light sheet 220 passes through the sample S. A "dual-sided illumination" technique has been developed to address these problems, by adding a second illumination objective lens on the side of the sample opposite to the first illumination objective lens 112 and irradiating the sample S with a second light sheet of illumination light 104. However, the additional illumination light path increases the cost and complexity of the microscope. Moreover, dual-sided illumination increases light scattering in the z-direction (along the detection axis D, through the thickness of the sample S), which increases out-of-focus illumination and thus degrades image quality. Above-referenced U.S. Pat. No. 9,134,521 discloses a technique termed multi-directional SPIM (mSPIM) to address the problems of dual-sided illumination, which also entails the use of two different illumination light paths but in an alternating fashion so as to alternately illuminate the sample S. Hence, the mSPIM technique multiplies the number of separate images that must be required, thus increasing the amount of computational image fusion required. The mSPIM technique also entails rotating the sample S about the detection axis D to different angular positions, thus further multiplying the number of separate images that must be required and further increasing the cost and complexity of the microscope. Moreover, it can be difficult to align two or more light sheets properly relative to the sample plane, which impairs the ability to acquire a well-focused image.

In addition, known SPIM techniques such as those just described typically employ a sample chamber filled with a liquid such as a physiological solution or a clearing solution. The sample S is attached to a rod that is inserted into the chamber, and which is attached to the stages operated to translate and rotate the sample S. These techniques are not readily compatible with the use of sample supports commonly found in the laboratory such as glass microscope slides, multi-well microplates, and other sample containers. Particularly when the sample S is contained in the well of a microplate or in another type of container, an "illumination from the side" technique is not feasible.

As will now be described in further detail, the present disclosure provides a microscope configured to implement a fast three-dimensional (3D) imaging technique based on light-field imaging in comparison to conventional imaging techniques that capture only light intensity information. A microscope as disclosed herein combines light-field imaging with a selective illumination method that utilizes a light sheet in a substantially different manner in comparison to conventional SPIM techniques such as described above. One or more embodiments of a microscope as disclosed herein may be fluorescence-based. One or more embodiments of a microscope as disclosed herein may be particularly useful for producing image data from complex and functional biological samples such as organoids and spheroids. One or more embodiments of a microscope as disclosed herein may utilize certain microscope components that are readily available, and may be compatible with different types of sample supports such as, for example, microscope slides, multi-well microplates, and other types of sample containers such as vials, cuvettes, test tubes, sample cells, flow cells, etc. A microscope as disclosed herein may be set up in an epi-fluorescence configuration. A microscope as disclosed herein may be provided as a stand-alone instrument or may be integrated with other types of analytical instruments such as, for example, multimode readers configured for carrying out different types of optical-based (e.g., fluorescence, luminescence, and absorbance) measurements on samples.

Figure 4:
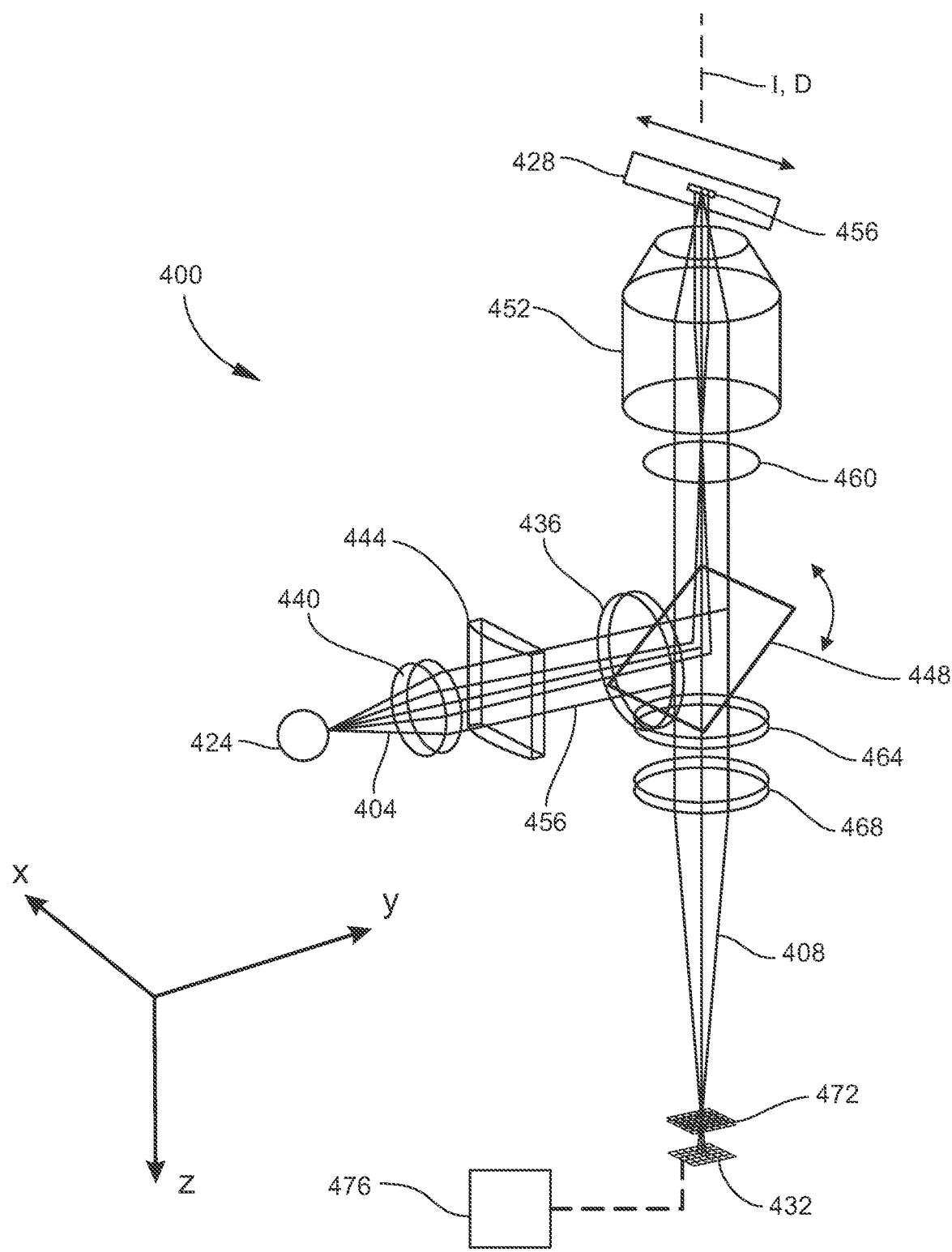
FIG. 4 is a schematic view of an example of a light-field microscope according to a representative embodiment disclosed herein.

FIG. 4 is a schematic view of an example of a light-field microscope 400 according to a representative embodiment disclosed herein. Generally, the structure and operation of various types of microscopes are understood by persons skilled in the art, and thus certain components and features of the microscope 400 are described only briefly to facilitate an understanding of the subject matter taught herein. The microscope 400 may generally include a light source 424 configured for generating illumination light (excitation light) 404, a sample stage 428 for supporting a sample under analysis (not shown), a light detector (or image sensor) 432 configured for collecting (capturing an image of) detection light (emission light) 408, various illumination optics for defining (i.e., establishing or providing) an illumination (or excitation) light path from the light source 424 to the sample at the sample stage 428, and various detection optics for defining a detection (or emission) light path from the sample to the light detector 432. In some embodiments, the microscope 400 may be configured for exciting the sample at a specific excitation wavelength and detecting fluorescent light emitted from the sample at a longer wavelength in response to the excitation. In such embodiments, a fluorescent agent or fluorophore (e.g., fluoroscein) may be added to the sample as appreciated by persons skilled in the art. In such embodiments, the microscope 400 may be set up in an epi-fluorescence configuration as illustrated in FIG. 4. In other embodiments, the microscope 400 may be configured for detecting light reflected or scattered from (or transmitted through) the sample generally at the same wavelength as the light utilized to illuminate the sample.

Generally, the light source 424 may be any light source suitable for light (optical) microscopy. For example, the light source 424 may be a solid-state light source such as a light emitting diode (LED) or a solid-state laser, or alternatively may be a semiconductor-based laser (laser diode or LD). In some embodiments, the light source 424 may include a plurality of light sources (e.g., multiple LEDs) that generate light at different wavelengths. Such light sources may be mounted to wavelength selector, such as a motorized wheel (not shown) that enables automatic (computerized) selection of the light source and thus the wavelength of the excitation light to be utilized in a given application, as appreciated by persons skilled in the art. In some embodiments, the light source 424 may be a broadband light source that operates in conjunction with an excitation filter 436 that only allows the desired excitation wavelength of light to pass.

The sample stage 428 is schematically depicted as a sample plane at which the sample is positioned and supported by the sample stage 428. The sample stage 428 may generally be any platform for supporting a sample, or a sample and a substrate supporting the sample (e.g., a microscope slide, microplate, other container), in a fixed position thereon. As in other drawing figures, for illustrative purposes FIG. 4 includes a Cartesian (x, y, z) frame of reference, the origin (x=0, y=0, z=0) of which has been arbitrarily positioned relative to the illustrated microscope 400. In the present context, the x-axis and y-axis are taken to lie in a transverse plane, and the z-axis is taken to be the axis or direction that is orthogonal to the transverse plane and thus the sample plane. Accordingly, the thickness of the sample is defined along the z-axis (or z-direction). In some embodiments, the sample stage 428 (and thus the sample thereon) may be movable by manual or motorized actuation, e.g., by utilizing controlled precision micro-motors as appreciated by persons skilled in the art. That is, the position of the sample stage 108 may be adjustable by the user along the x-axis, y-axis, and/or z-axis. As an example, in FIG. 1 an arrow above the sample stage 428 indicates movement along the x-axis. In some embodiments, in addition to being translatable along one or more axes, the sample stage 108 may be rotatable about one or more axes.

Generally, the light detector 432 may be any imaging device suitable for light microscopy such as, for example, the type of imaging device that forms the basis of cameras. In typical embodiments, the light detector 432 is a multi-pixel (or pixelated) imaging device such as, for example, a charge-coupled device (CCD) or an active-pixel sensor (APS) based on complementary metal-oxide-semiconductor (CMOS) technology. In some embodiments, the microscope 400 may also include an eyepiece or ocular lens (not separately shown) to enable the user to view the sample, in which case appropriate optical components (e.g., beam splitter) are provided to split the detection light path so that the detection light 408 is directed to both the light detector 432 and the eyepiece. Thus, the light detector 432 in FIG. 1 may be considered as schematically representing an imaging device, or both an imaging device and an eyepiece.

In the present embodiment, optics (optical components) defining the illumination light path include a condenser lens 440, a light-sheet focusing device such as a cylindrical lens 444, a beam splitter 448 (e.g., a dichroic beam splitter or mirror), the excitation filter 436 (particularly in fluorescence-based embodiments), and an objective lens 452. Depending on the embodiment, other optics may be included such as, for example, other lenses (e.g., collimating lenses, relay lenses, field lenses, etc., a beam expander, other mirrors, etc.), as appreciated by persons skilled in the art. For example, an aperture stop and a field stop (not shown) may be included and may be positioned between the light source 424 and the condenser lens 440 to limit the transmission of the illumination light 404 emitted by the light source 424 in the x-direction and the y-direction.

The condenser lens 440 may be any lens configured for collecting the illumination light 404 generated by the light source 424 and concentrating the illumination light 404. The cylindrical lens 444 may be any lens configured for focusing the illumination light 404 received from the condenser lens 440 into a thin, planar light sheet 456. The light sheet 456 is characterized by having a generally rectilinear cross-section, with one dimension of the cross-section (e.g., length) being substantially greater than the other dimension of the cross-section (e.g., width), as described above in conjunction with FIG. 2. The light sheet 456 is utilized for selective illumination of the sample along its thickness, as described further below. If the light source 424 produces a small-diameter beam such as a laser beam, a beam expander (not shown) may be placed in the illumination light path between the light source 424 and the cylindrical lens 444 to more completely fill the cylindrical lens 444. Instead of the cylindrical lens 444, a suitable alternative may be a slit such as may be provided at an aperture stop.

The beam splitter 448 is included in some embodiments, particularly in embodiments employing an epi-fluorescence setup as illustrated in FIG. 1. The beam splitter 448 is configured to reflect light at the wavelengths contemplated for the illumination light 404 and to transmit light at the wavelengths contemplated for the detection light 408. In some embodiments, the beam splitter 448 may include a plurality of beam splitters having different optical reflection/transmission characteristics. Such beam splitters may be mounted to wavelength selector, such as a motorized wheel (not shown) that enables automatic (computerized) selection of the beam splitter with the desired reflection/transmission spectrum. The beam splitter 448 may be movable, i.e., the position of the beam splitter 448 may be adjustable. In the illustrated embodiment, the beam splitter 448 is rotatable about the x-axis as indicated by the curved arrow in FIG. 4, enabling the angle of the illumination axis I relative to the sample plane to be adjusted. In the present context, the illumination axis I is the direction along which the light sheet 456 (illumination light 404) propagates when the light sheet 456 is incident on the sample. Hence, the angle of the illumination axis I is the angle of incidence of the light sheet 456. In the present embodiment, the illumination axis I is the direction along which the light sheet 456 propagates after being reflected by the beam splitter 448.

The objective lens 452 may be any device configured for collecting the detection light 408 emanating from the sample and focusing the detection light 408 onto the light detector 432. In the present embodiment in which the microscope 400 has an epi-fluorescence configuration, the objective lens 452 is in the illumination light path I as well as the detection light path D, and thus also is configured for transmitting and focusing the illumination light 404 (as a light sheet 456) onto the sample. Thus, in this embodiment the illumination light axis I (after deflection by the beam splitter 448) and the detection light axis D are coincident, and separate objective lenses for illumination and detection are not needed. As illustrated, the objective lens 452 has a pupil 460 in front of the objective lens 452, between the objective lens 452 and the beam splitter 448.

In the present embodiment, optics (optical components) defining the detection light path include the objective lens 452, the beam splitter 448 (configured to transmit the detection light 408 therethrough), an emission filter 464 (particularly in fluorescence-based embodiments), a tube lens 468 (particularly in when the objective lens 452 is an infinity-corrected objective lens), and a microlens array 472.

The microlens array 472 is an array (typically two-dimensional) of closely grouped microlenses or lenslets (lenses having a diameter on the order of micrometers to few millimeters) supported on a suitable substrate. The microlens array 472 may be constructed using microfabrication techniques known to persons skilled in the art. The microlenses may be circular and arranged in a hexagonal pattern allowing close grouping of the microlenses on the supporting substrate. Alternatively, the microlenses may be square and arranged in a grid-like pattern on the supporting substrate. In some embodiments, the microlenses are plano-convex. The microlens array 472 is configured to focus light onto the active sensing elements of the light detector 432 in a manner that allows the light detector 432 to capture the light field associated with the illuminated region of the sample instead of an image based solely on light intensity. Hence, the microlens array 472 allows the microscope 400 to function as a light-field microscope. The light field may be defined in terms of a bundle of light rays, with each light ray having a magnitude (intensity) and a direction. The magnitude of a light ray may be given by radiance, i.e. the amount of light traveling along a ray, which may be measured in watts (W) per steradian (sr) per meter squared ($m^2$). The direction of each light ray may be given by a multi-dimensional plenoptic function dependent on both spatial coordinates and angles, as appreciated by persons skilled in the art. As one example, a light ray may be represented by a four-dimensional function $L(u,v,s,t)$, which is a two-plane parameterization by which the light ray is considered to pass through a point on a u-v plane and then pass through a point on an s-t plane. Information regarding both the position and direction of the light rays is acquired by the light detector 432 and utilized to generate an image of the sample. The microlens array 472 may include, for example, thousands or millions of microlenses. In some embodiments, the number of active sensing elements (e.g., pixels) provided by the light detector 432 is substantially greater than the number of microlenses provided by the microlens array 472, such that a light ray transmitted through one microlens may be sensed by several active sensing elements. In some embodiments, the microlenses are sized and positioned relative to the sensors of the light detector 432 such that light rays transmitted through adjacent microlenses do not overlap with each other.

The microlens array 472 may be positioned at an image plane, such as an intermediate image plane created by one of the optical components in the optical train such as the objective lens 452 or the tube lens 468. In some embodiments and as illustrated, the microlens array 472 may be positioned between the tube lens 468 and the light detector 432. In other embodiments, the tube lens 468 is not included and the microlens array 472 in effect replaces the tube lens 468. In some embodiments, the microlens array 472 may be positioned at a distance from the light detector 432 equal to one focal length f of the microlenses of the microlens array 472. The focal length f of a lens is the distance from the lens to its focus (the image point at which light rays from the scene converge), as appreciated by persons skilled in the art. In some embodiments, the f-number of the microlens array 472 matches the f-number of the imaging optics defined by the pupil diameter and the focal length of the tube lens 468. The f-number may be expressed as $N=f/D$, where f is the focal length and D is the diameter of the entrance pupil (effective aperture) of a lens, as appreciated by persons skilled in the art.

Referring to FIG. 4, the microscope 400 may further include a computing device (or system controller) 476 in electrical communication with the light detector 432. The computing device 476 may be configured to receive light-field images captured by the light detector 432, and digitize and record the images. The computing device 476 may also be configured to process the captured light-field data as needed for generating 3D images of the sample, such as by executing deconvolution and/or other algorithms useful for 3D rendering. The computing device 476 may also be configured to process the 3D images as needed for displaying the images on a display device such as a computer screen, and for enabling a user to enhance or control the display of the images in a desired manner. Generally for these purposes, the computing device 476 may include hardware (microprocessor, memory, etc.) and software components as appreciated by persons skilled in the art. For example, the computing device 476 may include a processor such as a main electronic processor providing overall control, and one or more electronic processors configured for dedicated control operations or specific signal processing tasks (e.g., a graphics processing unit, or GPU). The computing device 476 may also include one or more memories (volatile and/or non-volatile) for storing data and/or software. The computing device 476 may also include one or more device drivers for controlling one or more types of user interface devices and providing an interface between the user interface devices and components of the computing device. In addition to a display device, such user interface devices may include other user output devices (e.g., printer, visual indicators or alerts, audible indicators or alerts, and the like) and also user input devices (e.g., keyboard, keypad, touch screen, mouse controller, joystick, trackball, and the like). The computing device 476 may also include one or more types of computer programs or software contained in memory and/or on one or more types of computer-readable media. Computer programs or software may contain instructions (e.g., logic instructions) for performing all or part of any of the methods disclosed herein. Computer programs or software may include application software and system software. System software may include an operating system (e.g., a Microsoft Windows® operating system) for controlling and managing various functions of the computing device 476, including interaction between hardware and application software. In particular, the operating system may provide a graphical user interface (GUI) displayable via a user output device, and with which a user may interact with the use of a user input device. The computing device 476 may also include one or more data acquisition/signal conditioning components (as may be embodied in hardware, firmware and/or software) for receiving and processing the imaging data captured by the light detector 432, including formatting data for presentation in graphical form by the GUI, generating 3D images, etc.

It will be understood that FIG. 1 is a high-level schematic depiction of an example of the microscope 100 consistent with the present disclosure. Other optics, electronics, and mechanical components and structures not specifically shown in FIG. 1 may be included as needed for practical implementations, as appreciated by persons skilled in the art.

As an example of a general operation of the microscope 400, the sample under investigation may be prepared for microscopy as needed and then mounted to the sample stage 428. Typically, the sample is supported on (mounted on, held by, contained in, etc.) a suitable sample support (glass slide, well of a multi-well plate, other type of receptacle, etc.) and the sample support is then mounted to the sample stage 428. The light source 424 is then activated to generate illumination light 404, which may be broadband or narrowband light (e.g., centered on a desired wavelength) depending on the embodiment. In the present embodiment, the illumination light 404 is wavelength-filtered by the excitation filter 436. The illumination light 404 is directed to and concentrated by the condenser 440. The illumination light 404 is then directed to the cylindrical lens 444, which focuses the illumination light 404 into a light sheet 456. The illumination light 404 is then reflected by the beam splitter 448 toward the sample, whereby the illumination light 404 propagates as the light sheet 456 along the illumination axis I (z-axis). In the present embodiment, the angle of the illumination axis relative to the sample plane (the transverse x-y plane) is dictated by the orientation of the beam splitter 448. The illumination light 404 is then focused by the objective lens 452 onto a selected region of the sample. The illumination light 404 incident on the sample is still in the form of the light sheet 456.

In response to the illumination, the sample emits detection light 408, which in the present embodiment is fluorescent light. The objective lens 452 collects the detection light 408 and focuses the detection light 408 at an image plane. Alternatively, if the tube lens 468 is included, the objective lens 452 transmits the detection light 408 to the tube lens 468 and the tube lens 468 focuses the detection light 408 at the image plane. In either case, the beam splitter 448 is configured to allow the detection light 408 to pass through the beam splitter 448 without being reflected or attenuated. In the present embodiment, the detection light 408 is wavelength-filtered by the emission filter 464. The microlens array 472, positioned at the image plane in the present embodiment, focuses the rays of the detection light 408 onto the active sensing elements of the light detector 432. The light detector 432 outputs the light-field image information as electrical signals to the computing device 476, which processes the signals to generate a 3D image of the illuminated region of the sample.

Figure 5:
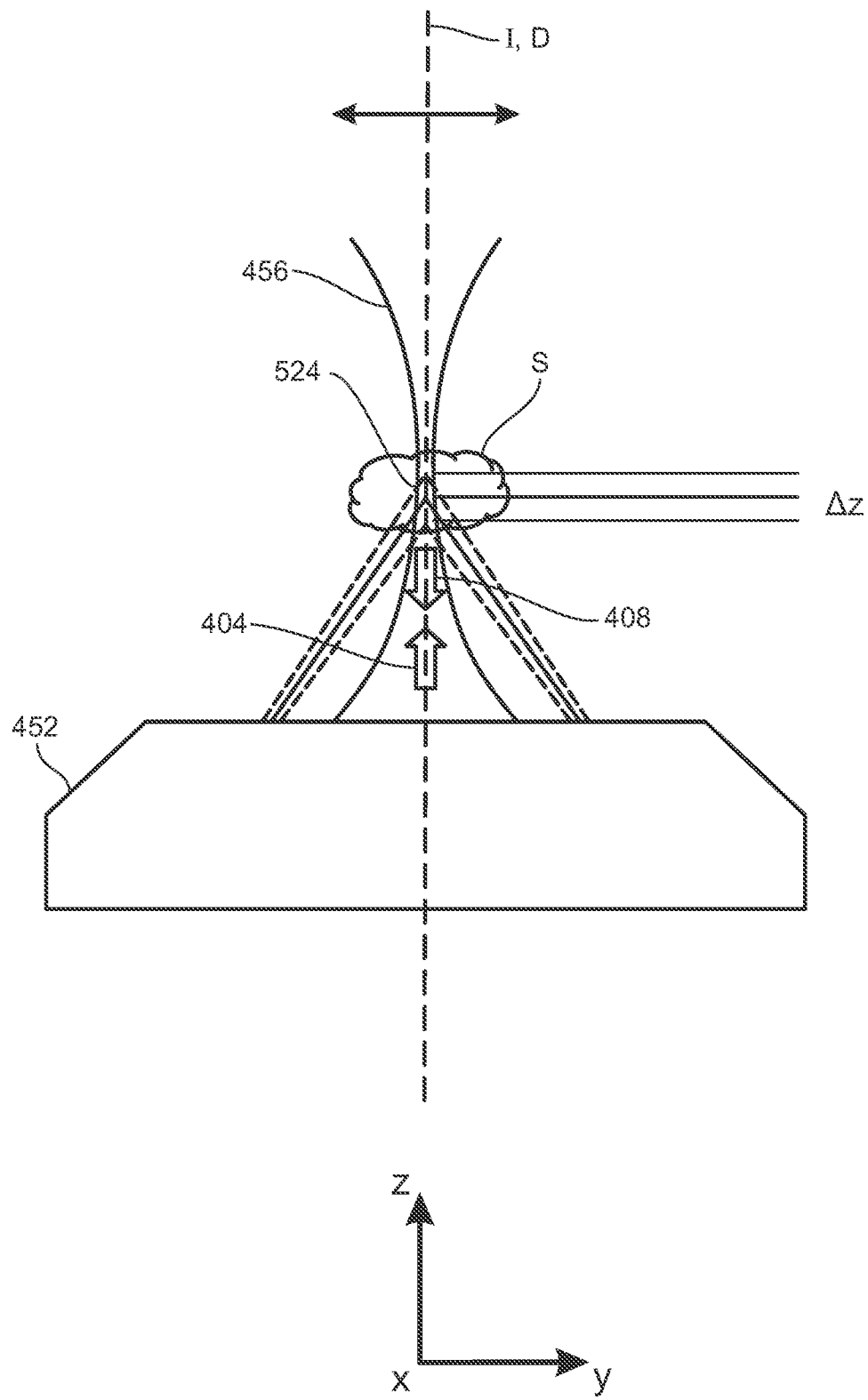
FIG. 5 is a schematic view of a sample illuminated by a light sheet in accordance with embodiments disclosed herein.

In the present embodiment the sample is illuminated by the light sheet 456, thereby enabling selective illumination, i.e., illumination of selected regions of the sample. FIG. 5 is a schematic view of a sample S illuminated by the light sheet 456 in accordance with embodiments disclosed herein. The light sheet 456 has a beam waist 524 that may be positioned in the sample S. The illumination axis I of the light sheet 456, and thus the plane of illumination, is different from that of conventional SPIM-related techniques such as described above in conjunction with FIGS. 1-3. In conventional SPIM, the light sheet is directed along an illumination axis that is parallel with the sample (x-y) plane. Hence, to obtain image information on the whole sample S, conventional SPIM as well as confocal microscopy techniques require that the sample S be scanned in the z-direction and a separate image be acquired at each iteration of the scan. Then, the multiple images need to be processed appropriately to construct a 3D view of the sample. By contrast, in the present embodiment the illumination axis I of the light sheet 456 is oriented in a direction non-parallel with the sample plane. In the example specifically illustrated in FIGS. 4 and 5, the light sheet 456 is oriented at ninety degrees relative to the sample plane, i.e., directly along the z-axis. More generally, the angle of the light sheet 456 (and thus the illumination axis I) may be in a range from 0 to 180 degrees relative to the sample plane, although in practice the angular range of the light sheet 456 is limited by the physical constraints of the objective lens 452 and/or other components of the optical train. For example, the angle of the light sheet 456 (and thus the illumination axis I) may be in a range from 45 to 135 degrees relative to the sample plane. At any such angles, in the present embodiment the selected plane of illumination provided by the light sheet 456 is directed through the thickness of the sample S (in a selected region of the sample S). Because the angle or direction of the light sheet 456 has a component in the z-direction, a light sheet 456 as disclosed herein may be referred to as a "vertical" light sheet, which may be contrasted with the "horizontal" light sheet employed in conventional SPIM.

Like conventional SPIM, limiting the illumination of the sample S to a selected plane (i.e., a thin volume around a plane) reduces the background signal and thus produces a higher contrast in the image, and reduces photo-bleaching, photo-damage, and heating of the sample S (as well as stress in a living sample). However, with the vertical light sheet 456 (i.e., oriented at ninety degrees or other non-parallel angle to the sample plane) the microscope 400 provides additional advantages. The microscope 400 may be set up with a common epi-illumination type of configuration like as shown in FIGS. 4 and 5, with the illumination axis I being coincident with the detection axis D. Such configuration allows readily available optical components such as objective lenses, beam splitters, etc. to be utilized.

Figure 6:
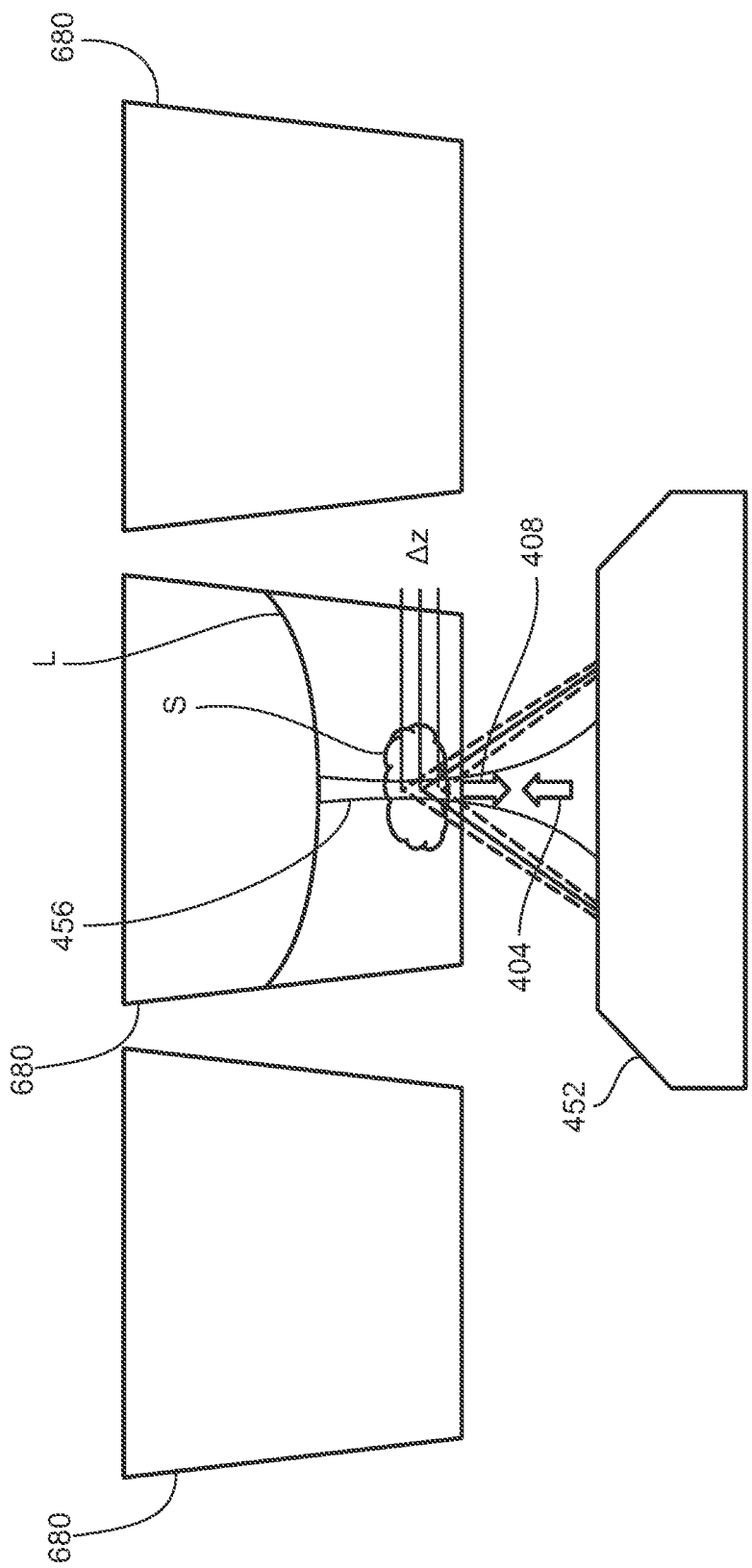
FIG. 6 is a schematic view of a sample illuminated by a light sheet while disposed in a container, in accordance with embodiments disclosed herein.

Moreover, the vertical light sheet 456 renders the microscope 400 compatible with a wide variety of sample supports such as, for example, glass slides, multi-well microplates, vials, etc. FIG. 6 is a schematic view of a sample S illuminated by the light sheet 456 while disposed in a container 680, in accordance with embodiments disclosed herein. The container 680 may be one of a plurality of containers 680 arranged in an array. As examples, the containers 680 may be the wells of a microplate, vials or test tubes supported by a rack, etc. The sample S may be immersed in a liquid L. Other samples may be disposed in the other containers 680, and may be immersed in the same liquid or different liquids, or the same solvent but containing different reagents, or different multi-solvent compositions. The side walls of the containers 680, and solid media between adjacent containers 680 (e.g., the solid structure of a microplate), do not interfere with the vertical light sheet 456. Moreover, depending on the type of container 680, the light sheet 456 may be scanned over a range of angles relative to the sample S without encountering the solid structure of the container 680.

As an additional advantage, because the microscope 400 acquires light-field data instead of just light intensity data, (at least for most samples of the type to be imaged by the microscope 400) the sample S does not need to be scanned through its thickness along the detection axis D (z-direction). That is, only a single light-field image needs to be acquired, and only digital post-processing needs to be performed (e.g., by the computing device 476) in order to derive a z-stack or otherwise produce a 3D image of the sample S. As one non-limiting example, the useable z-range Δz (FIGS. 5 and 6) is typically 6 to 10 times larger than the depth of field (DOF) of the objective lens 452. For a 20× objective lens featuring 0.4 NA the nominal DOF is 8 µm, in which case a typical lightfield acquisition would result in an accessible z-range of approximately 50 µm, which is a reasonable measure for the imaging of organoids. Another limit in Δz is set by the length of the light sheet 456. According to Gaussian optics the light sheet 456 will develop its beam waist 524 in the y dimension at the focal point of the objective lens 452. The length of the lightsheet 456 Δz is defined by the maximum acceptable distance±(½) Δz from the beam waist 524. The limit is defined by the maximum acceptable beam cross-section as a function of z. However, depending on the characteristics of the light source 424 (laser, LED, etc.), the collimation optics (e.g., cylindrical lens 444), and the pupil size, the numerical aperture and the focal length of the objective lens 452, the length of the light sheet 456 may be up to a few millimeters.

As noted earlier in the present disclosure, in past work light-field imaging has produced image artifacts and background noise, due for example to ambiguities in the final reconstruction algorithms utilized. However, it is contemplated that embodiments disclosed herein, in which selective plane illumination is implemented in conjunction with light-field imaging, will improve the quality of reconstructed 3D images of samples by reducing artifacts.

While embodiments disclosed herein may eliminate the requirement of scanning the sample S in the z-direction, depending on the size of the sample S and/or the field of view (FOV) of the objective lens 452, obtaining image information on the whole sample S may require scanning the sample S through the transverse plane, for example along the x-direction or y-direction. Scanning the sample S may be done by moving (translating and/or rotating) the sample S itself relative to the light sheet 456 and/or by moving (translating and/or rotating) the light sheet 456 relative to the sample S. As one example, the sample stage 428 may be configured to translate the sample S, as indicated by the arrow above the sample stage 428 in FIG. 4 and the arrow above the sample S in FIG. 5. As another example, the beam splitter 448 (or "scanning mirror"), or other beam-steering component in the illumination light path, may be configured to rotate (as indicated by a curved arrow in FIG. 4) so as to scan the light sheet 456 through the sample, in this case by adjusting the angle of incidence of the light sheet 456 on the sample.

Figure 7:
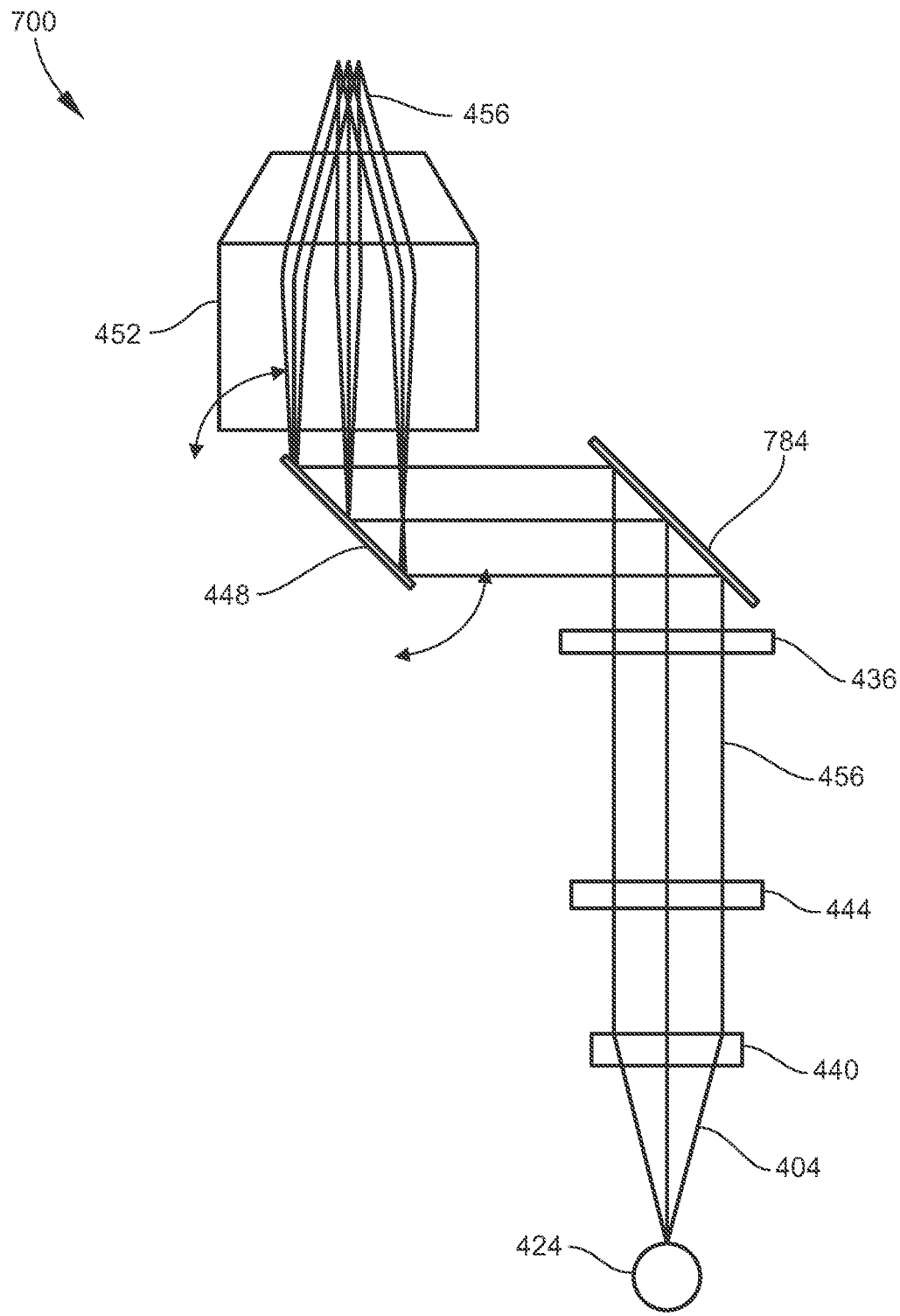
FIG. 7 is a schematic view of an example of a light-field microscope (or a portion thereof) according to another embodiment disclosed herein.

FIG. 7 is a schematic view of an example of a light-field microscope 700 (or a portion thereof) according to another embodiment. Generally, the microscope 700 may include components that are the same or similar to those of the microscope 400 described above and illustrated in FIG. 4. However, in the present embodiment the scanning mirror 448 is positioned at the pupil of the objective lens 452. This configuration as the advantage of maintaining the telecentric condition. Microscope optics benefit from being telecentric by providing a constant viewing angle (preferably) 90°) onto the specimen across the entire field. Consequently, for SPIM this means a constant inclination angle of the lightsheet 456 with respect to the specimen across the entire field. One or more additional mirrors 784 may be provided in the illumination light path to provide spatial accommodation for the optics of the detection light path not shown in FIG. 7, for example the emission filter 464, tube lens 468, microlens array 472, and light detector 432 described above and illustrated in FIG. 4. Either the scanning mirror 448 or another mirror 784 may be configured as a beam splitter, and the optics of the detection light path may be positioned accordingly.

Figure 8:
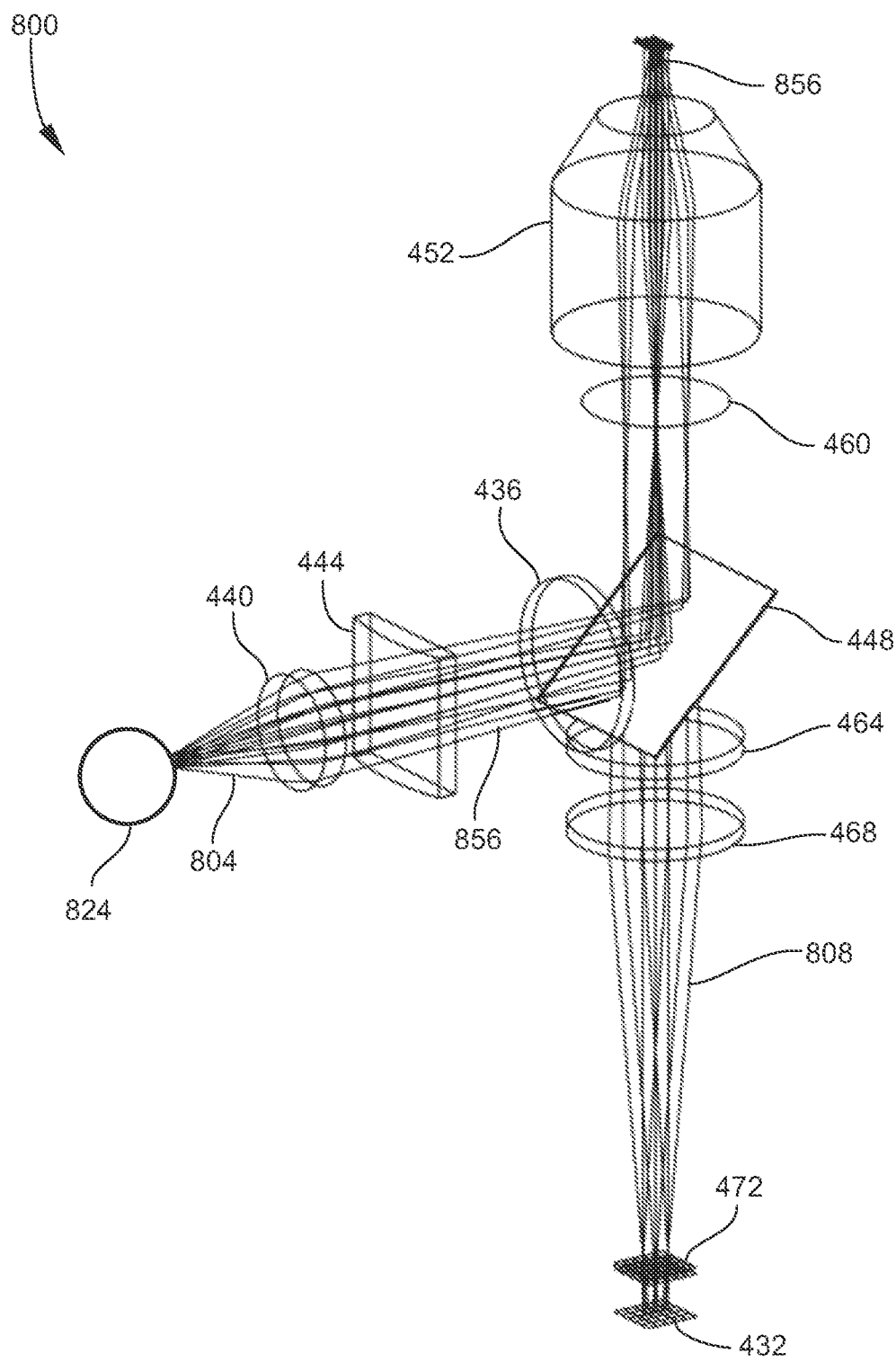
FIG. 8 is a schematic view of an example of a light-field microscope according to another embodiment disclosed herein.

FIG. 8 is a schematic view of an example of a light-field microscope 800 according to another embodiment. Generally, the microscope 800 may include components that are the same or similar to those of the microscope 400 described above and illustrated in FIG. 4. However, in the present embodiment the microscope 800 includes a light source 824 configured for generating a plurality of illumination light beams 804, which are then focused as a plurality of light sheets 856 onto the sample. In response, the sample may emit a plurality of detection light beams 808. The light source 824 may, for example, include a plurality of point sources (e.g., multiple LEDs or laser emitters), or one or more light sources directing light to a plurality of pinholes or slits positioned at an aperture stop between the light source(s) and the condenser lens 440. When slits are provided, the cylindrical lens 444 may not be needed. As another example, the light source 824 may include an active projection device such as may include or be based on a digital micromirror device (DMD), a liquid crystal on silicon (LCoS) device, or a liquid crystal display (LCD) device.

Figure 9:
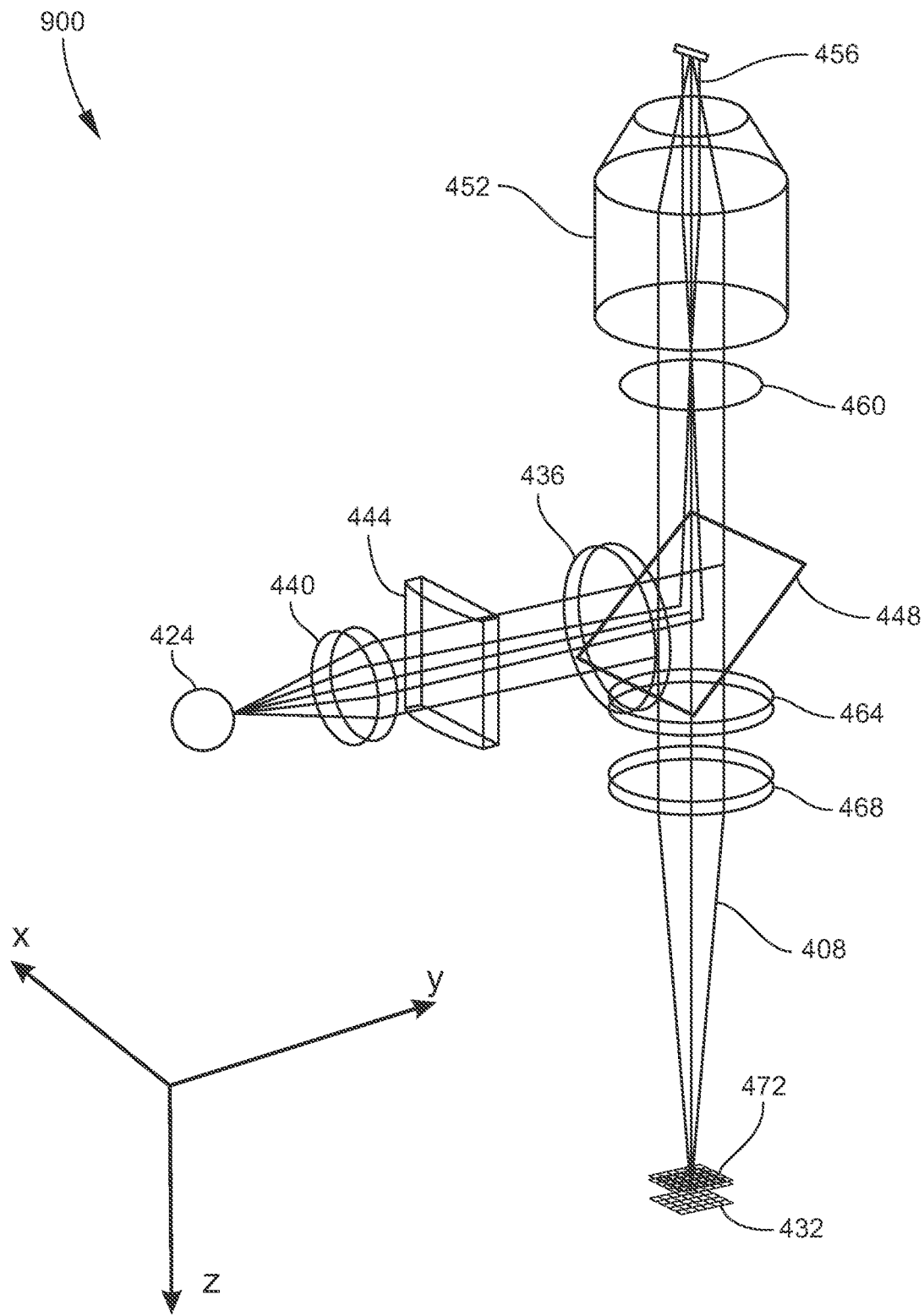
FIG. 9 is a schematic view of an example of a light-field microscope according to another embodiment disclosed herein.

FIG. 9 is a schematic view of an example of a light-field microscope 900 according to another embodiment. Generally, the microscope 900 may include components that are the same or similar to those of the microscope 400 described above and illustrated in FIG. 4. However, in the present embodiment the microscope 900 has a focused Galilean configuration. This approach enables enhancements in terms of lateral resolution compared to configuration of the microscope 400 shown in FIG. 4, by exploiting the details in the microimages formed by the microlens array 472 at the detector position. However, reconstruction algorithms are different compared to those used for the microscope 400 and rely on stereographic projection based on correspondences. The term "Galilean" refers to the optical layout of the microscope 900, which has similarities to a Galilean type telescope. In some embodiments, the microlens array 472 may completely replace the tube lens 468.

Figure 10:
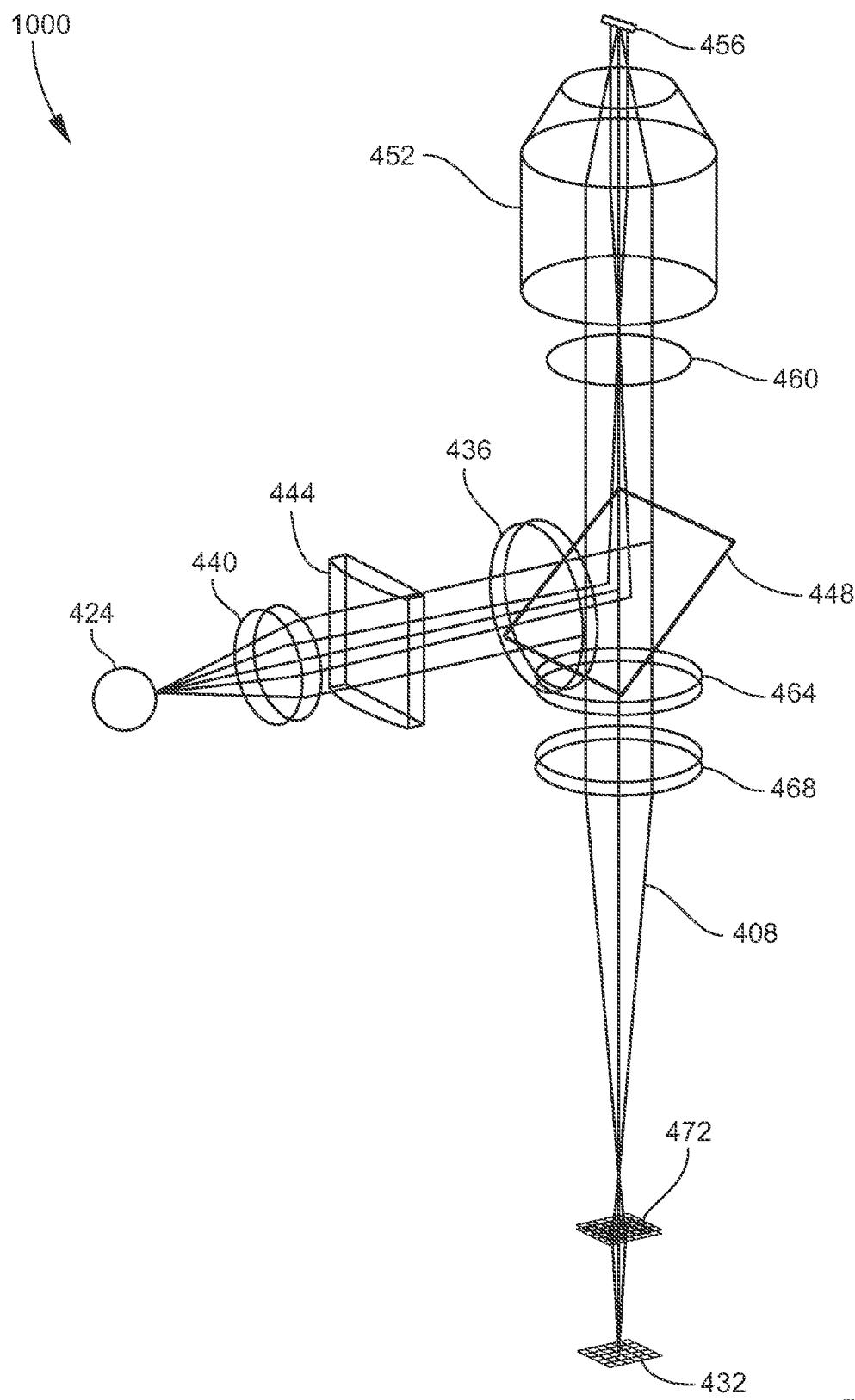
FIG. 10 is a schematic view of an example of a light-field microscope according to another embodiment disclosed herein.

FIG. 10 is a schematic view of an example of a light-field microscope 1000 according to another embodiment. Generally, the microscope 1000 may include components that are the same or similar to those of the microscope 400 described above and illustrated in FIG. 4. However, in the present embodiment the microscope 1000 has a focused Keplerian configuration. The optical layout of this configuration relates to a Keplerian type telescope, but in terms of optical performance the same benefits as for the Galilean type apply. The pros with respect to the Galilean configuration are longer distances. Commonly, this configuration shows greater flexibility when adapted to a given microscope stand. The pros of the Galilean configuration are a shorter optical train and that the variation of the effective resolution across the accessible z-range can be controlled better.

As described above, in the configuration shown in FIG. 4, the microlens array 472 may be positioned at a distance from the light detector 432 equal to one focal length f of the microlenses of the microlens array 472. By comparison, in the Galilean configuration shown in FIG. 9, the microlens array 472 may be positioned at a distance from the light detector 432 that is less than one focal length f of the microlenses of the microlens array 472. On the other hand, in the Keplerian configuration shown in FIG. 10, the microlens array 472 may be positioned at a distance from the light detector 432 that is greater than one focal length f of the microlenses of the microlens array 472.

The Galilean and Keplerian configurations may also be described by the following thin lens equation: $(1/d_o)+(1/d_i)=(1/f)$, where f is the focal length of the microlenses of the microlens array 472, $d_i$ is the distance between the microlenses and the image (where the light detector 432 is positioned), and $d_o$ is the distance between the microlenses and the object (where the intermediate image formed by the tube lens 468 is positioned). The intermediate image is schematically shown, for example, in FIG. 10 as the point just above the microlens array 472 where the rays are depicted as transitioning from converging to diverging. As an example for the Keplerian configuration, assuming the focal length f=10 mm and the lens-to-object distance $d_o$=20 mm, then $(1/20)+(1/d_i)=(1/10)$. Thus, the lens-to-image distance $d_i$=20 mm. As an example for the Galilean configuration, again assuming the focal length f=10 mm and the lens-to-object distance $d_o$=−20 mm (the negative sign accounting for the relative positions of the microlens array 472 and the object (intermediate image), as shown in FIG. 9), then $(1/-20)+(1/d_i)=(3/20)$. Thus, the lens-to-image distance $d_i$=6.67 mm.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the system controller (computing device) 476 schematically depicted in FIG. 4. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), application specific integrated circuits (ASICs), or field-programmable gate arrays (FPGAs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the system controller 476 shown in FIG. 4), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A light-field microscope, comprising:
 a light source configured for generating illumination light;
 a condenser lens configured for receiving the illumination light from the light source and outputting the illumination light as focused illumination light;
 a light-sheet focusing device configured for receiving the focused illumination light from the condenser and outputting the illumination light as a light sheet on an illumination light axis, wherein the light sheet has a relatively small thickness compared to a length or a width thereof and has a longitudinal axis extending in a direction of the length of the light sheet;
 a sample stage configured for supporting a sample in a sample plane and for receiving the light sheet along the illumination light axis, the illumination light axis being non-parallel to the sample plane;

an objective lens configured for receiving detection light from the sample on a detection light axis and for receiving and focusing the light sheet into the sample, the detection light axis and the illumination light axis being coincident relative to each other at least in a volume defined by the sample such that the longitudinal axis of the light sheet in the volume of the sample is aligned with and extends coincidentally along the detection light axis;

a microlens array configured for receiving the detection light from the objective lens; and a light detector configured for receiving the detection light from the microlens array and measuring light-field parameters of the detection light.

2. The light-field microscope of claim 1, wherein the light source is configured for generating the illumination light at a wavelength effective for inducing fluorescent detection light from the sample.

3. The light-field microscope of claim 1, wherein the light source is configured for generating a plurality of illumination light beams, and the light-field focusing device is configured for outputting the plurality of illumination light beams as a plurality of light sheets.

4. The light-field microscope of claim 1, wherein the light-sheet focusing device is selected from the group consisting of: a cylindrical lens; and an aperture comprising one or more slits.

5. The light-field microscope of claim 1, comprising optics configured for defining at least a part of an illumination light path from the light source to the sample, and for defining at least a part of a detection light path from the sample to the light detector.

6. The light-field microscope of claim 5, wherein the optics comprise a dichroic mirror configured for receiving the light sheet and reflecting the light sheet toward the sample, and for receiving the detection light and transmitting the detection light toward the light detector.

7. The light-field microscope of claim 5, wherein the objective lens is positioned in both the illumination light path and the detection light path.

8. The light-field microscope of claim 5, wherein the optics comprise a movable mirror configured for adjusting an angle of the illumination direction relative to the sample plane.

9. The light-field microscope of claim 8, wherein the movable mirror is positioned at a pupil of the objective lens.

10. The light-field microscope of claim 1, wherein the sample stage is configured for translating the sample in the sample plane, or rotating the sample plane relative to the light sheet, or both of the foregoing.

11. The light-field microscope of claim 1, wherein the sample stage is configured for supporting an array of sample containers.

12. The light-field microscope of claim 1, wherein the microlens array is positioned at an image plane.

13. The light-field microscope of claim 1, wherein the light detector is positioned at a distance from the microlens array equal to one focal length of lenslets of the microlens array.

14. The light-field microscope of claim 1, wherein the light detector is positioned at a distance from the microlens array such that the light-field microscope has a Galilean configuration.

15. The light-field microscope of claim 1, wherein the light detector is positioned at a distance from the microlens array such that the light-field microscope has a Keplerian configuration.

16. The light-field microscope of claim 1, comprising a tube lens between the objective lens and the microlens array.

17. The light-field microscope of claim 16, wherein the f-number of the microlens array matches the f-number of imaging optics defined by the pupil diameter and the focal length of the tube lens.

18. The light-field microscope of claim 1, comprising a computing device configured for processing light-field data received from the light detector.

19. The light-field microscope of claim 18, wherein the computing device is configured for generating a three-dimensional image from the light-field data.

20. A method for acquiring a light-field image from a sample, the method comprising:

supporting the sample in a focal plane of an objective lens;

generating illumination light;

focusing the illumination light as a light sheet, the illumination light being on an illumination light axis, wherein the light sheet has a relatively small thickness compared to a length or a width thereof and has a longitudinal axis extending in a direction of the length of the light sheet;

irradiating the sample by directing and focusing the light sheet to the sample along the illumination light axis, the illumination light axis being directed at an angle that is non-parallel to the sample plane, wherein in response to the irradiating, the sample emits detection light;

directing the detection light on a detection light axis, the detection light axis and the illumination light axis being coincident relative to each other at least in a volume defined by the sample such that the longitudinal axis of the light sheet in the volume of the sample is aligned with and extends coincidentally along the detection light axis; and measuring light-field parameters of the detection light at the light detector.

21. The method of claim 20, comprising generating a three-dimensional image of the sample based on the measured light-field parameters.

22. The method of claim 20, wherein the sample has a thickness along the illumination direction, and further comprising generating a three-dimensional image of the sample based on the measured light-field parameters without scanning the sample along the illumination direction.

23. The method of claim 20, wherein the illumination direction is in a range from 45 to 135 degrees relative to the sample plane.

24. The method of claim 20, comprising adjusting an angle of the illumination direction relative to the sample plane.

25. The method of claim 20, comprising scanning the sample along the sample plane.

26. The method of claim 20, comprising supporting the sample in a container while measuring light-field parameters.

27. The method of claim 20, wherein irradiating the sample comprises reflecting the illumination light from a dichroic mirror toward the sample, and directing the detection light comprises transmitting the detection light through the dichroic mirror.

* * * * *